UNITED STATES PATENT OFFICE 1,944,413

TREATMENT OF CELLULOSE DERIVATIVES

George Holland Ellis, Henry Charles Olpin, and Ernest William Kirk, Spondon, near Derby, England, assignors to Celanese Corporation of America, a corporation of Delaware No Drawing. Application July 20, 1929, Serial No. 379,875, and in Great Britain August 1, 1928

9 Claims. (Cl. 8—5)

This invention relates to the dyeing, printing, stencilling, or otherwise colouring of threads, yarns, knitted or woven fabrics, or other products made of or containing cellulose acetate or other cellulose esters, or cellulose ethers.

According to this invention materials made of or containing cellulose acetate or other organic substitution derivatives of cellulose whether cellulose esters or cellulose ethers are coloured by applying, in the unreduced state, derivatives of benzoquinone or naphthoquinones in which one or more nuclear hydrogen atoms are replaced by amino or substituted amino groups, or by applying, in the unreduced state, benzoquinone- or naphtho-quinone-mono- or di-imides or their N-substitution products.

The substituents present in the amino or imino groups may be, for example, alkyl, aryl, or aralkyl groups which may themselves contain further substituents. The quinone or quinoneimide residues may also contain further nuclear substituents, for example, alkyl groups, nitro groups, hydroxyl groups, or halogen. The quinoneimides may contain amino or substituted amino nuclear substituents.

The following are examples of colouring matters which can be employed according to the present invention which is not limited thereto.

(1) 2:5-diaminobenzoquinone (obtainable by the action of ammonia on benzoquinone) dyes cellulose acetate in yellow shades.

(2) 2:5-di-(methylamino)-benzoquinone (obtainable by the action of methylamine on benzoquinone) dyes cellulose acetate in yellow-brown shades.

(3) 2:5-di-(phenylamino)-benzoquinone (obtainable by the action of aniline on benzoquinone) dyes cellulose acetate in reddish-grey shades.

(4) 2:5-di-(p-aminophenylamino)-benzoquinone (obtainable by the action of p-phenylenediamine on benzoquinone) dyes cellulose acetate in brown shades.

(5) 2:5 - di - (p-dimethylaminophenylamino)-benzoquinone (obtainable by the action of p-aminodimethylaniline on benzoquinone) dyes cellulose acetate in purplish-brown shades.

(6) 2:5 - di-(phenylamino)-3:6-dichlorbenzoquinone (obtainable from chloranil and aniline) dyes cellulose acetate in yellow shades.

(7) 2-p-anisidine-1:4-naphthoquinone (obtainable by the action of p-anisidine on 1:4-naphthoquinone) dyes cellulose acetate in dull scarlet shades.

(8) 2 - (p-aminophenylamino)-1:4 - naphthoquinone (obtainable by the action of p-phenylenediamine on 1:4-naphthoquinone) dyes cellulose acetate in heliotrope shades.

(9) 1-imino-2-hydroxy-4-p-tolylimino - naphthalene of the formula:

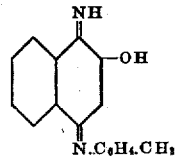

(made by the action of p-toluidine on 1-amino-2-naphthol-4-sulphonic acid with simultaneous or subsequent oxidation) dyes cellulose acetate in orange shades.

(10) 1-imino-2-hydroxy - 4 - (aminophenylimino)-naphthalene of the formula:

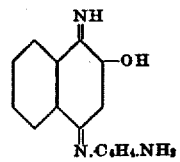

(made by the action of p-phenylene-diamine on 1-amino-2-naphthol-4-sulphonic acid with simultaneous or subsequent oxidation) dyes cellulose acetate in puce shades.

The colouring matters may be applied to the goods in solution or in aqueous suspension or they may be brought into colloidal solution by any of the methods known in the art such as by grinding (for example in colloid mills) with or without dispersators and/or protective colloids, by dissolving in a solvent and pouring into water containing or not containing protective colloids, by pretreating with dispersators, or by other methods. Of the dispersators which are suitable for obtaining such dispersions may be mentioned those described in U. S. Patents Nos. 1,618,413, 1,618,414, 1,694,413, U. S. applications Nos. 134,138 filed 7th September 1926 and 176,289 filed 17th March 1927; viz: bodies of oily or fatty characteristics, namely higher fatty acids or sulphonated or other derivatives thereof containing salt-forming groups, such as sulphoricinoleic or other sulphonated fatty acids or salts of such acids or bodies for instance their alkali or ammonium salts, used alone or in conjunction with auxiliary solvents as described in U. S. Patent No. 1,690,481 and U. S. application No. 152,517 filed 3rd December 1926; carbocyclic compounds containing in their structure one or more salt-forming groups or salts of such compounds; sulpho-aromatic fatty acids or salts thereof; and soluble resin soaps or sodium or other soluble salts or soaps of resin acids. The compositions containing one or more of the aforementioned benzoquinone or naphthoquinone colouring matters in dispersed form together with a dispersator and/or a protective colloid are new and are included within the invention.

The following examples illustrate the invention but are not to be regarded as limiting it in any way:—

Example 1

100 grams of 2: 5-diaminobenzoquinone are ground to a fine powder and stirred into 750 grams of sodium sulphoricinoleate (50%). The whole is heated to 80–90° C. with stirring until as homogeneous as possible, diluted to about 10 litres with boiling soft water, and added through a filter cloth to 300 litres of soft water in a suitable machine. 10 kilograms of cellulose acetate woven fabric are now entered, and dyeing commenced cold, the temperature being raised to 75° during ¾ hour and maintained at this for a further ¾ hour. The goods dyed a yellow shade, are now lifted, rinsed and dried or otherwise treated as requisite.

Example 2

100 grams of 2-(para-aminophenylamino)-1:4-naphthoquinone are ground to a fine powder and stirred into 500 grams of the sulpho-aromatic fatty acid product prepared according to Example A. in U. S. Patent No. 1,694,413. The mixture is then heated until a maximum dispersion is obtained, then diluted with boiling soft water, and sieved into a dyebath containing 300 litres of soft water. 10 kilograms of celulose acetate yarn are then entered and processed, and the temperature raised according to the common method of dyeing, until the desired heliotrope shade is achieved. The goods are then lifted, rinsed and dried or otherwise treated as requisite.

Example 3

100 grams of 1-imino-2-hydroxy-4-paratolylimino naphthalene are ground into a fine powder and dispersed by heating with 600 grams of sodium sulphoricinoleate (50%), diluted with 10 litres of ¼% soap solution, and added through a filter cloth to 300 litres of water containing 10 lbs. of olive oil soap in a suitable machine. 10 kilograms of cellulose acetate knit fabric are then entered cold and the temperature raised during ¾ hour to 75° C. and maintained at this for a further ¾ hour. The goods, now dyed a bright orange shade, are then lifted, rinsed and dried or otherwise treated as requisite.

Though the invention has been described more particularly with reference to the colouring of cellulose acetate it is also applicable to the dyeing, printing, stencilling or otherwise colouring of other organic substitution derivatives of cellulose, for example threads, yarns, knitted or woven fabrics, or other products made of or containing cellulose esters such as cellulose formate, propionate, or butyrate, or the products obtained by the treatment of alkalized cellulose with esterifying agents (e. g. the product known as "immunized cotton", obtained from p-toluenesulpho-chloride), or made of or containing cellulose ethers such as methyl, ethyl or benzyl cellulose, or the corresponding condensation products of collulose and gycols or other polyhydric alcohols. Mixed goods comprising for example, in addition to one or more cellulose esters or ethers, silk, wool, or cellulose fibres natural or artificial, such as cotton or the cellulose type of artificial silk, may be dyed in solid or contrasting shades according to the affinity of the non-ester and non-ether portion of the goods. The mixed goods may be dyed with other dyestuffs for the non-ester and non-ether portion thereof either before, after, or together with the dyestuffs applied according to the present invention.

By the term "amino- and imino-derivatives of benzo and naphtho quinones" used in the accompanying claims, we mean those compounds derived from benzo and naphtho quinones by the replacement of hydrogen atoms and oxygen atoms by amino groups and imino groups respectively.

What we claim and desire to secure by Letters Patent is:—

1. Process of dyeing materials containing organic substitution derivatives of cellulose, comprising applying a water insoluble coloring matter selected from the group consisting of benzo- and naphthoquinones substituted in the nucleus by at least one group $N.R_1R_2$ wherein $R_1$ and $R_2$ represent hydrogen or alkyl groups, the said coloring matter being applied in aqueous dispersion in unreduced form.

2. Process of dyeing materials containing organic substitution derivatives of cellulose, comprising applying thereto 2:5-di-methylamino-benzoquinone in aqueous dispersion in unreduced form.

3. Process of dyeing materials containing cellulose acetate, comprising applying a water insoluble coloring matter selected from the group consisting of benzo and naphthoquinones substituted in the nucleus by at least one group $N.R_1R_2$ wherein $R_1$ and $R_2$ represent hydrogen or alkyl groups, the said coloring matter being applied in aqueous dispersion in unreduced form.

4. Process of dyeing materials containing cellulose acetate, comprising applying thereto 2:5-di-methylamino-benzoquinone in aqueous dispersion in unreduced form.

5. Process of dyeing materials containing organic substitution derivatives of cellulose comprising applying a water insoluble coloring matter selected from the group consisting of benzo- and naphthoquinone di-imides substituted in at least one imino group by an aryl residue, said coloring matter being applied in aqueous dispersion in unreduced form.

6. Process of dyeing materials containing organic substitution derivatives of cellulose comprising applying thereto 1-imino-2-hydroxy-4-paratolylimino naphthalene, said coloring matter being applied in aqueous dispersion in unreduced form.

7. Process of dyeing materials containing cellulose acetate comprising applying a water insoluble coloring matter selected from the group consisting of benzo- and naphthoquinone di-imides substituted in at least one imino group by an aryl residue, said coloring matter being applied in aqueous dispersion in unreduced form.

8. Process of dyeing materials containing cellulose acetate comprising applying thereto 1-imino - 2 - hydroxy - 4 - paratolylimino naphthalene, said coloring matter being applied in aqueous dispersion in unreduced form.

9. Materials containing organic substitution derivatives of cellulose colored with a water insoluble coloring matter selected from the group consisting of benzo- and naphthoquinones substituted in the nucleus by at least one group $N.R_1R_2$ wherein $R_1$ and $R_2$ represent hydrogen or alkyl groups.

GEORGE HOLLAND ELLIS.
HENRY CHARLES OLPIN.
ERNEST WILLIAM KIRK.

Certificate of Correction

Patent No. 1,944,413.   January 23, 1934.

GEORGE HOLLAND ELLIS ET AL.

It is hereby certified that error appears in the printed specification of the above numbered patent requiring correction as follows: Page 3, strike out the seven lines comprising present claim 9, and insert the following as claim 9:

9. (1) Process of dyeing materials containing organic substitution derivatives of cellulose, comprising applying a water insoluble coloring matter selected from the group consisting of (1) benzo- and napthoquinones substituted in the nucleus by at least one group $N.R_1R_2$ wherein $R_1$ and $R_2$ represent hydrogen or alkyl groups, and (2) benzo- and naphthoquinone di-imides substituted in at least one imino group by an aryl residue, said coloring matter being applied in aqueous dispersion in unreduced form.

and that the said Letters Patent should be read with this correction therein that the same may conform to the record of the case in the Patent Office.

Signed and sealed this 13th day of March, A. D. 1934.

(SEAL)
F. M. HOPKINS,
*Acting Commissioner of Patents.* consisting of benzo- and naphthoquinone di-imides substituted in at least one imino group by an aryl residue, said coloring matter being applied in aqueous dispersion in unreduced form.

8. Process of dyeing materials containing cellulose acetate comprising applying thereto 1-imino - 2 - hydroxy - 4 - paratolylimino naphthalene, said coloring matter being applied in aqueous dispersion in unreduced form.

9. Materials containing organic substitution derivatives of cellulose colored with a water insoluble coloring matter selected from the group consisting of benzo- and naphthoquinones substituted in the nucleus by at least one group $N.R_1R_2$ wherein $R_1$ and $R_2$ represent hydrogen or alkyl groups.

GEORGE HOLLAND ELLIS.
HENRY CHARLES OLPIN.
ERNEST WILLIAM KIRK.

Certificate of Correction

Patent No. 1,944,413.   January 23, 1934.

GEORGE HOLLAND ELLIS ET AL.

It is hereby certified that error appears in the printed specification of the above numbered patent requiring correction as follows: Page 3, strike out the seven lines comprising present claim 9, and insert the following as claim 9:

9. (1) Process of dyeing materials containing organic substitution derivatives of cellulose, comprising applying a water insoluble coloring matter selected from the group consisting of (1) benzo- and napthoquinones substituted in the nucleus by at least one group $N.R_1R_2$ wherein $R_1$ and $R_2$ represent hydrogen or alkyl groups, and (2) benzo- and naphthoquinone di-imides substituted in at least one imino group by an aryl residue, said coloring matter being applied in aqueous dispersion in unreduced form.

and that the said Letters Patent should be read with this correction therein that the same may conform to the record of the case in the Patent Office.

Signed and sealed this 13th day of March, A. D. 1934.

(SEAL)

F. M. HOPKINS,
*Acting Commissioner of Patents.*